United States Patent Office 3,590,019
Patented June 29, 1971

3,590,019
TRI(DIALKYLAMINOPHENYL THIOALKYLENE) PHOSPHITE STABILIZED OLEFIN POLYMER COMPOSITIONS
Hans Z. Lecher, Plainfield, N.J., and Harry Braus, Springdale, and Jay R. Woltermann, Cincinnati, Ohio, assignors to National Distillers and Chemical Corporation, New York, N.Y.
No Drawing. Original application Dec. 21, 1967, Ser. No. 692,261, now Patent No. 3,504,056, dated Mar. 31, 1970. Divided and this application Oct. 16, 1969, Ser. No. 870,896
Int. Cl. C08f 45/58
U.S. Cl. 260—45.9     9 Claims

ABSTRACT OF THE DISCLOSURE

Olefin polymer compositions are stabilized with tri(dialkylaminophenyl thioalkylene) phosphites having the formula:

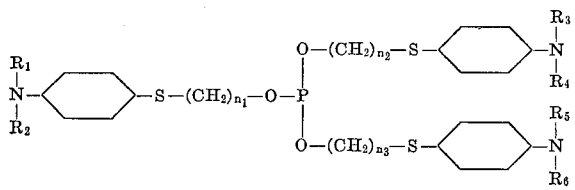

in which $n_1$, $n_2$ and $n_3$ are integers from two to about six; and $R_1$, $R_2$, $R_3$, $R_4$, $R_5$ and $R_6$ are alkyl having from one to about four carbon atoms alone or with hindered phenols and/or carbon black.

---

This is a divisional application of copending U.S. Ser. No. 692,261, filed Dec. 21, 1967 and issued as U.S. Pat. No. 3,504,056 on Mar. 31, 1970.

This invention relates to tri(dialkylaminophenyl thioalkylene(phosphites and to compositions useful in the enhancement of the resistance of olefin polymers, such as ethylene polymers, to deterioration in physical properties due to heat, comprising a tri(dialkylaminophenyl thioalkylene)phosphite, alone or in combination with carbon black and/or a hindered phenol, and to olefin polymer compositions having an enhanced resistance to heat deterioration, due to incorporation therein of such compounds, and to a process of enhancing the resistance of olefin polymers to heat deterioration, employing such compounds.

Many of the most important applications of polyethylene such as its use in cable sheathings depend upon its superior physical properties, as evaluated by low temperature brittleness, tensile strength and abrasion resistance tests coupled with good water repellency. Other uses take advantage of its high dielectric strength in applications such as primary insulation of wire conductors.

Unfortunately, however, polymeric materials such as polyethylene are subject to deterioration in air and weather from sunlight, i.e., ultraviolet radiation, and heat, both of which induce oxidation of the polyethylene and thereby lead to increased brittleness at low temperatures and reduced tensile strength and dielectric properties.

In addition, when polyethylene is mechanically worked in the presence or absence of air at the elevated temperatures necessary for processing, molecular structural changes occur wherein the polymer deteriorates in tensile elongation, and the original electrical resistivity of the polymer at high and low frequencies diminishes progressively. At the same time undesirable changes occur in both the viscous and elastic components of melt flow behavior. Cross-linking occurs upon prolonged exposure of the polymer to ultraviolet radiation in the presence of air.

It is customary to incorporate small amounts of carbon black into polyethylene to shield it from the deleterious degradative effects of ultraviolet radiation, and thereby enhance its resistance to light deterioration. Many compounds, so-called thermal stabilizers or antioxidants, are incorporated as well, to enhance the resistance of polyethylene to thermal and oxidative degradation, such as various amines, diaryl mono-sulfides, phenolic compounds, organic phosphites, and the like.

In view of the fact that carbon black when incorporated into essentially saturated hydrocarbon polymers also acts as a mild thermal stabilizer, it might be expected that the incorporation of stabilizers into polymeric materials containing carbon blacks would result in increased stability against thermally induced deterioration. It was discovered many years ago, however, that not only is the effect of such stabilizers and carbon black in the polymer not necessarily additive, but that the effectiveness of many stabilizers in the presence of carbon black can be and frequently is reduced severalfold. In many instances the stabilizer is rendered completely ineffective so that the polymer has no more resistance against thermal or oxidative degradation than does a sample containing no stabilizer whatsoever. The diminished activity or complete ineffectiveness of many thermal antioxidants such as diphenyl-p-phenylenediamine or the hindered phenol, 2,2'-methylenebis-(4-methyl-6-t-butyl-phenol), when in combination with carbon black is reported in the Journal of Applied Polymer Science, 1, 37 to 42, 43 to 49 (1959).

A class of tri(dialkylaminophenyl thioalkylene) phosphites has been discovered which, even when combined with carbon black, are capable of enhancing resistance to deterioration of polyolefin compositions, esuch as polyethylene, in physical properties due to exposure to heat, despite the presence of carbon black.

In accordance with the instant invention, a stabilizer system for polyolefins is provided consisting essentially of tri(dialkylaminophenyl thioalkylene) phosphite, alone or in combination with carbon black and/or a hindered phenol, to improve resistance of the polyloefins to heat-induced deterioration, for long periods of time. Such a combination displays a surprising stabilizing action against heat-induced deterioration, particularly in view of the presence of the carbon black and/or phenol, suggesting that each component of the combination synergizes the stabilizing action of the other. This is especially surprising in view of the fact that in combination with carbon black the effectiveness of most commercially available antioxidants is decreased.

The special properties of the tri(dialkylaminophenyl thioalkylene) phosphite-carbon black combination are enhanced when it is combined with a hindered phenol. The Journal of Applied Polymer Science article cited hereinbefore described the deleterious effects that carbon black has on the hindered phenol 2,2'-methylenebis(4-methyl-6-t-butyl-phenol), which alone (without carbon black) gives good protection to polyethylene against heat-induced deterioration but which with carbon black is practically ineffective. In the presence of the tri(dialkylaminophenyl thioalkylene) phosphite, however, the combination of the carbon black with the hindered phenol not only does not destroy the effectiveness of the phenol but synergizes the effectiveness thereof, so that the three component combination is more effective than any of the components or pairs of components thereof, taken separately. This is a surprising result, that could not have been predicted even from the effectiveness of the combination of carbon black and tri(dialkylaminophenyl thioalkylene) phosphite.

Thus, also in accordance with the instant invention, a preferred composition of the invention is provided, consisting essentially of a combination of a tri(dialkylaminophenyl thioalkylene) phosphite, carbon blacks, and a hindered phenol, which combination is more effective than any of the components or pairs of components thereof in enhancing the resistance of olefin polymers, such as ethylene polymers, to deterioration in physical properties upon exposure to heat.

In addition, in accordance with the instant invention olefin polymer compositions are provided, such as ethylene polymer compositions, consisting essentially of the olefin polymer in combination with a tri(dialkylaminophenyl thioalkylene) phosphite, alone, or with carbon black and/or hindered phenol, and preferably consisting essentially of the olefin polymer in combination with the tri(dialkylaminophenyl thioalkylene)phosphite, carbon black a hindered phenol.

Further, in accordance with the instant invention a process for enhancing the resistance of olefin polymers, such as ethylene polymers, to deterioration in physical properties upon exposure to heat is provided, which comprises incorporating in the olefin polymer a tri(dialkylaminophenyl thioalkylene) phosphite, alone or with carbon black and/or a hindered phenol, and preferably a combination of tri(dialkylaminophenyl thioalkylene) phosphite, carbon black and a hindered phenol.

The tri(dialkylaminophenyl thioalkylene) phosphites in accordance with the invention can be defined by the formula:

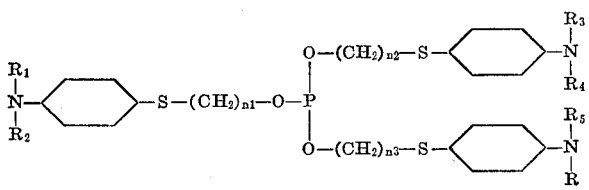

in which $n_1$, $n_2$ and $n_3$ are integers from two to about six; and $R_1$, $R_2$, $R_3$, $R_4$, $R_5$ and $R_6$ are alkyl having from one to about four carbon atoms. Thus, the phosphite will not have more than about sixty carbon atoms.

As typical R radicals there can be mentioned methyl, ethyl, propyl, isopropyl, butyl, sec-butyl, and tert-butyl. Typical $(CH_2)_n$ alkylene racidals are ethylene, propylene, butylene, amylene and hexylene.

Examples of dialkylaminophenyl thioalkylene phosphites suitable for use herein include, but are not limited to, tri-(4-dimetylaminophenyl thioethylene) phosphite,
tri-(4-diethylaminophenyl thioethylene) phosphite,
tri-(4-diisopropylaminophenyl thiopropylene) phosphite,
tri-(4-butylaminophenylthiobutylene) phosphite,
mono-(4-dibutylaminophenyl thioethylene) di-(4-dimethylaminophenyl thioethylene) phosphite,
tri-(4-diisobutylaminophenyl thioamylene phosphite, and
tri-(4-isopropylmethylaminophenyl thioethylene) phosphite.

The dialkylaminophenyl thioalkylene phosphites can be prepared by known procedures, which form no part of the instant invention. Thus, for example, they can be readily prepared by reaction of the appropriate sodium 4-dialkylamino thiophenolate with the corresponding ω-haloalkylene phosphite to form the corresponding alkyl thiophenyl phosphite.

This is a known reaction, and forms no part of the instant invention. Using a mixture of 4-dialkylamino thiophenols, and/or ω-haloalkylene phosphites, the reaction product can be composed of a mixture of 4-dialkylaminophenyl thioalkylene phosphites, which can also be employed in the instant invention.

Carbon black suitable for use herein includes both activated or unactivated types, such as channel carbon black, furnace carbon black, animal or vegetable carbon black, thermal carbon black, light lamp blacks, acetylene blacks and the like, and carbon blacks activated in the presence of such materials as oxygen, sulfur or selenium. The average particle size of carbon black used herein should be below about 1000 angstroms, and preferably below about 200 angstroms, so as to ensure the obtention of a uniform dispersion of the carbon black through the polymer.

The phenols which can be used herein should be hindered, i.e., substituted in both positions ortho to the hydroxyl group, and can contain from about eight to about 300 carbon atoms. Such phenols can be monocyclic or polycyclic, and monohydric or polyhydric.

The hindered monocyclic phenols which can be employed have the structure:

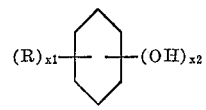

R is selected from the group consisting of halogen; and organic radicals containing from one to about thirty carbon atoms, such as alkyl, aryl, alkenyl, alkaryl, aralkyl, cycloalkenyl, cycloalkyl, alkoxy, aryloxy and acyl

where R' is aryl, alkyl, or cycloalkyl.

$x_1$ is an integer from two to four, and $x_2$ is an integer from one to four, and the sum of $x_1$ and $x_2$ does not exceed six.

The monocyclic phenol containing one or more hydroxyl groups should be substituted in both positions ortho to each hydroxyl group.

Polycyclic phenols include aromatic nuclei which are linked by a bivalent linking radical, and are defined by the formula:

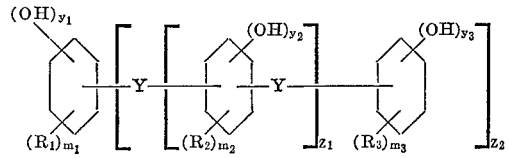

wherein $R_1$, $R_2$, and $R_3$ are inert substituent groups of the type of R above, Y is a bivalent linking radical, and is selected from the group consisting of oxygen atoms or an alkylene or alicyclene or arylene or a mixed alkylene-alicyclene or mixed alkylene-arylene groups, having a straight or branched chain, whose total number of carbon atoms ranges from one to about eighteen, $m_1$ is an integer from one to a maximum of $5-(z_2+y_1)$; $m_2$ can be an integer from zero to three; and $m_3$ an integar from one to four. $z_1$ can be an integer from zero to about six and $z_2$ an integer from one to fiive, preferably one or two. Preferably, the hydroxyl groups in polycyclic phenols are located ortho and/or para to Y. There can be from one to four hydroxyl groups per phenyl nucleus, $y_1$, $y_2$ and $y_3$ representing the numbers thereof, each phenyl nucleus being substituted in both positions ortho to each hydroxyl group. Preferably, there will be only one hydroxyl group per phenyl nucleus.

Y can be a single bond, as in diphenyl, or a bivalent group, such as:

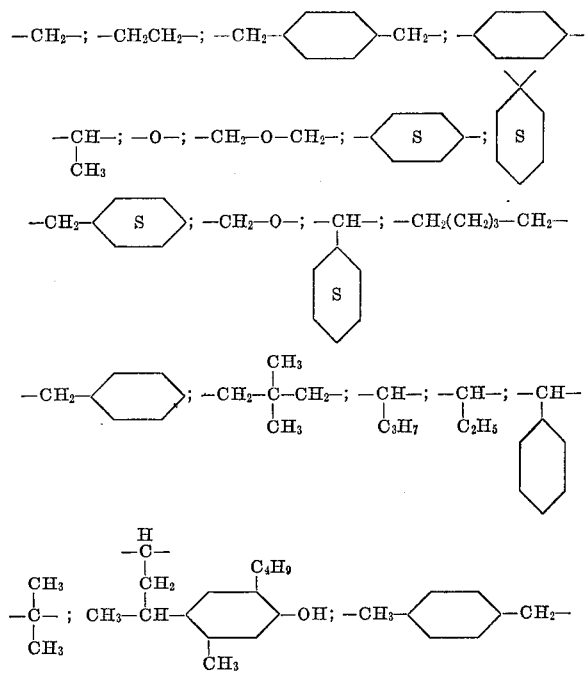

Representative phenols include 2,6-di-tert-butyl-4-methyl phenol, 2-tert-butyl-6-methoxy phenol, 2,6-dinonyl phenol, 2,3,4,6-tetradecyl phenol, 2-isopropyl-6-dodecyl phenol, 2-methyl-6-octyl phenol, 2 - hexyl-6-n-decyloxy phenol, 2-nonyl-3-methyl-6-decyloxy phenol, and 2-nonyl-6-benzyl-oxyphenol, 2,6 - di-tert-butyl-2-methoxy-p-cresol (Antioxidant 762) and 3,5-di-tert-butyl-4-hydroxybenzyl ether.

Exemplary polyhydric monocyclic phenols are: 2-ethyl-4-octyl-6-methyl resorcinol, 2-dodecyl-4-methyl-6-nonyl-resorcinol, 2-methyl-4-isooctyl-6-dodecyl-phloroglucinol, 2,4,6-tri-tert-butyl-resorcinol, and 2,4,6-triisopropyl-phloroglucinol.

Exemplary polyhydric polycyclic phenols are 2,2'-methylenebis (6 - tert - butyl - phenol), 2,2'-methylene-bis-(4-methyl-6-tert-butyl-phenol) (Cyanamid 2246), 4,4'-methylene-bis (2,6-di-tert-butyl-phenol) (Ethyl Antioxidant 712 or Ionox 220), 2,2'-methylene-bis (4-ethyl-6-tert-butyl-phenol) (Cyanamid 162), 4,4'-methylene-bis (6-tert butyl-o-cresol) (Ethyl Antioxidant 220), 4,4'-oxobis (2-methyl-6-isopropyl phenol), 2,2'-oxobis (6-dodecyl phenol), 4,4'-n-butylidene-bis (2-tert-butyl-6-methylphenol), 4,4'-benzylidenebis (2-tert-butyl-6-methylphenol), 4,4'-cyclohexylidenebis (2,6-di-tert-butyl phenol), 1,3,5-tri methyl-2,4,6-tris(3,5-di-tert-butyl-4-hydroxy - benzylbenzene) (Ionox 330), 2,2'-methylene-bis (4-methyl-6-(1'-methyl-cyclohexyl)-phenol), 2,6-bis (2'-hydroxy-3'-tert-butyl-5'-methylbenzyl) - 4 - methylphenol, 1,1,3-tris (2-methyl-4'-hydroxy-5'-tert - butylphenyl) butane and $\alpha^2, \alpha^6$ bis (3-tert-butyl-5-methyl-2-hydroxy-phenyl)-mesitol.

The preferred stabilizer system of the invention conprises two or three stabilizers, the dialkylaminophenyl thioalkylene phosphite and carbon black and/or a hindered phenol. These two and three stabilizers together can display a stabilizing effectiveness which is not depressed by the carbon black or hindered phenol, and which can exceed that obtainable from any of them alone, or in combinations of two. On the other hand, however, when the hindered phenol alone is employed with carbon black, the hindered phenol loses almost all of its antioxidant effectivenes, and accordingly the synergistic result using the three component combination is especially unexpected. This enhanced stabilizing effect is obtained with any olefin polymer, regardless of the process by which it is prepared.

A sufficient amount of the stabilizer combination of the invention is used to enhance the resistance of the olefin polymer against deterioration in physical properties, including, for example, resistance to embrittlement upon exposure to heat under the conditions to which the polymer will be subjected. Small amounts are usually adequate. Amounts of the dialkylamino phenyl thioalkylene phosphite within the range from about 0.002 to about 0.5% by weight of the olefin polymer and amounts of carbon black within the range from about 0.2 to about 5% by weight of the olefin polymer are satisfactory. For many polyethylene applications, carbon black concentrations of up to about 50% can be present, especially where partially conductive polyolefin-carbon black compounds are employed. Preferably, from about 0.05 to about 0.15% of the dialkylaminophenyl thioalkylene phosphite and from about 2 to about 3% of the carbon black are employed for optimum enhancement of resistance to heat deterioration.

The hindered phenol can be used in quantities as low as about 0.002%, and as high as about 0.5% by weight of the olefin polymer, and preferably in amounts from about 0.02 to about 0.1% by weight of the olefin polymer.

The two component combinations of stabilizers of the invention will generally contain from about 0.05 to about 0.15% of the dialkylaminophenyl thioalkylene phosphite, and from about 0.3 to about 3.0% of the carbon black, or from about 0.02 to about 0.1% of the hindered phenol, by weight of the combination. The three component combinations include all three in the same relative amounts.

Other thermal stabilizers can be employed in the compositions of the present invention such as organic hydrocarbon phosphites, thiodipropionic acid esters, polyvalent metal salts or organic acids, organic polysulfides, aminophenols, and the like. Light stabilizers can be employed in the composition of the instant invention such as various 2-hydroxy-benzophenones, thiosalicylates and the like.

Conventional additives such as fillers, pigments, and plasticizers can also be present.

If a combination of stabilizers is to be utilized, they can be formulated as a simple mixture for incorporation in the polymer by the polymer manufacturer or by the converter. An inert organic solvent can be used to facilitate handling, if the ingredients do not form a homogeneous mixture or solution.

The stabilizer of the invention is appliacble to olefin polymers prepared by any of the various procedures, using the available catalysts (Chem. & Eng. News, Nov. 21, 1960, pp. 56–59), inasmuch as the molecular weight and tacticity are not factors affecting this stabilizer.

Formerly, olefin polymers prepared by these processes contained traces of catalyst residues. These residues materially diminished the stability of the olefin polymer despite efforts to overcome the problems by addition of polyvinyl chloride resin stabilizers, whose function was to act on the halogen or halide of the catalyst in the same manner as on the halogen or liberated halide of the polyvinyl chloride resin. It is now customary to remove catalyst residues substantially completely, so that the addition of polyvinyl chloride resin stabilizers is no longer indicated. The stabilizers of the invention are effective with olefin polymers substantially free from catalyst-containing polymers with good results.

The stabilizer or the invention is particularly applicable to ethylene homopolymers, which include normally solid low or high molecular weight homopolymers obtained from ethylene. Such polymers usually have a molecular weight of at least 6,000 and preferably a molecular weight of 20,000 to 45,000 or more. They have a waxy feel, and when examined by the X-ray diffraction technique exhibit the presence of a crystalline phase.

Mixtures of ethylene homopolymers with other compatible polyemrs, and copolymers of ethylene with copolymerizable monomers such as styrene, vinyl chloride, vinyl acetate, vinylidene chlorofluoride and methyl methacrylate which are not reactive with the stabilizer combination, the ethylene polymer or copolymer being present in a sufficient amount, usually a major amount, i.e. about 85% weight or more, to present the stabilization problem resolved by the invention, also can be stabilized. The term "ethylene polymer" as used herein include, accordingly, homopolymers such as low or high density polyethylene, and Ziegler polyethylene and ethylene copolymers, and mixtures of ethylene homopolymers, as discussed above.

The stabilizers of the invention can also be used with other olefin polymers, such as polypropylene, poly(butena-1), poly(pentene-1), poly(3-methyl butene-1), poly-4-methyl-pentene-1, and polystyrene.

The term "olefin polymer" encompasses both homopolymers and copolymers, as well as mixtures of olefin polymers.

The stabilizer is incorporated in the polymer in suitable mixing equipment, such as a mill, a Banbury mixer, an extruder and the like. If the ethylene polymer has a melt viscosity which is too high for the desired use, the ethylene polymer can be worked until its melt viscosity has been reduced to the desired range, before addition of the stabilizer. The resulting mixture is then removed from the mixing equipment, and brought to the size and shape desired, for marketing or use.

The stabilized olefin polymer can be worked into the desired shape, such as by milling, calendering, extrusion, or injection molding or fiber-forming.

The term "consisting essentially of," as used herein, means that the ingredients recited in the specification and claims are the essential ingredients of the composition of the invention and no others are employed which would be undesirable in the enhancement of the resistance of olefin polymers to deterioration in physical properties due to exposure to heat.

The following examples illustrate the preparation of the dialkylaminophenyl thioalkylene phosphites of the invention:

EXAMPLE A

Reaction I:

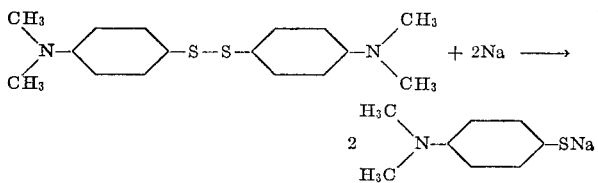

Procedure

Into a dry liter 3-neck flask, equipped with a stirrer, thermometer and condenser, protected with drying tubes, was placed (0.04 mole) 10.7 gms. of bis(dimethylaniline) disulfide and 50 ml. of xylene. This solution was heated to reflux and there was then added (0.04 mole) 1.7 gm. of sodium metal. This was heated at reflux with vigorous stirring for two hours, cooled to room temperature and the solvent decanted, leaving a dark yellow amorphous solid.

Procedure

Into a dry liter, 3-neck flask equipped with a stirrer, thermometer, addition funnel and condenser, protected with drying tubes, was placed (0.072 mole) 12.6 gms. of p-sodium mercaptide of dimethylaniline, and 50 ml. of 1,2-dimethoxyethane. This solution was heated to reflux, and a solution of (0.024 mole) 65 gms. of tri(2-chloroethyl)phosphite in 50 ml. of 1,2-dimethoxyethane was then added slowly. When the addition was complete, the batch was stirrde at reflux for ½ hour and filtered hot. The filtrate was stripped of solvent, leaving a tan viscous liquid. Yield=72%.

Examples 1 to 3.—One-, two- and three-component stabilizer compositions, tri(dialkylaminophenyl thioalkylene)phosphite, alone, with a hindered phenol, and the same plus carbon black, were evaluated for their stabilizing effect, in enhancing the resistance of polyethylene to deterioration in physical properties due to exposure to heat. The stabilizers used were tri(4-dimethylaminophenyl thioethylene) phosphite with Ethyl 702, 4,4'-methylenebis(2,6-ditertiary butyl phenol), and with channel carbon black having an average particle size of about 20 A. (Cabot Regal 330 R). The stabilizers were weighed and dispersed in previously unstabilized polyethylene (NA 280), melt index 0.15 (ASTM D1238–62T at 190° C.), using a two-compound laboratory Banbury mixer. The mixture was placed in a cold roll mill, and was flattened and the crepe produced cut to convenient size for subsequent tests. Table I below sets forth the stabilizers contained in each of the various samples of polyethylene prepared. Although Control A did not contain any stabilizers or carbon black, it was subjected to the same preparatory mixing as the other samples.

The effectiveness of the stabilizer systems of the invention in inhibiting heat deterioration was evaluated by DSC analysis (68C–725–175–1) as follows.

The Perkin Elmer Differential Scanning Calorimeter was employed. This apparatus is equipped with a recorder which records the heat or energy changes in the samples undergoing testing as a function of time (chart speed). When a noticeable break appears in the trace recorded, this indicates that the sample has undergone a change in condition. The samples tested were in the form of discs prepared as follows. Film was pressed from the resin at a temperature of 125° C. and a pressure of 800 p.s.i. Discs having a diameter of about ¼ inch and a thickness ranging from about 2 to about 3 mils were cut from the film. The discs were introduced into the calorimeter cell and heated from a temperature of 37° C. to a temperature of about 200° C. at a rate of 80° C./min. in an atmosphere of nitrogen. When the temperature reached 200° C., the nitrogen was replaced by oxygen flowing at a rate of 5 ml./min. and the recorder was at that time started. When a noticeable break appeared in the trace, the induction time was obtained from the chart speed which was set at 12 inches per hour. The reported DSC induction times are comparable when obtained at the same size, shape, and thickness of the sample, cell geometry, and rate of oxygen flow over the surface. The DSC of a standard sample was 13.2 min.

TABLE I

| Stabilizer | Controls | | | | Examples | | |
|---|---|---|---|---|---|---|---|
| | A | B | C | D | 1 | 2 | 3 |
| Tri(4-dimethylaminophenyl thioethylene) phosphite, p.p.m | | | | | 1,000 | 500 | 500 |
| 4,4'-methylenebis(2,6-di-tertbutylphenol), p.p.m | | 500 | 500 | | | 500 | 500 |
| Carbon black, percent | | | 2.6 | 2.6 | | | 2.6 |
| Minutes to failure (DSC analysis) | 2 | 2 | 13 | 25 | 4.6 | 19.9 | 49.8 |

Reaction II:

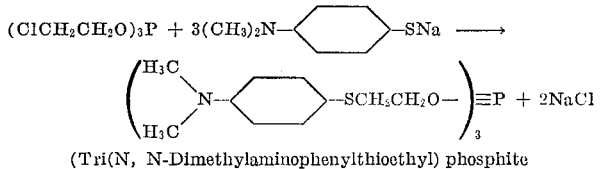

(Tri(N, N-Dimethylaminophenylthioethyl) phosphite

Control A is to be compared to Example 1; Controls A and C and Example 1 are to be compared to Example 2; and Controls B, D and Example 1 to Example 3. It is evident from Example 1 that thhe tri(4-dimethylaminophenyl thioethylene)phosphite enhanced the resistance of the polyethylene to heat deterioration. It is evident from Example 2 that the tri(4-dimethylaminophenyl thioethylene)phosphite greatly enhanced the effectiveness of the phenol (cf. Controls A, C, and Example 1). The additive effect should have been 17.6 (C and Example 1), whereas 19.9 was noted.

Addition of carbon black greatly enhanced the synergism. The additive effect expected for Example 3 should have been 29.6 (D and Example 1), whereas 49.8 was noted.

The data clearly show that the one-, two- and three-component stabilizer compositions of the instant invention enhanced the resistance of polyethylene against degradation due to exposure to heat.

Having regard to the foregoing disclosure, the following is claimed as the inventive and patentable embodiments thereof:

1. An olefin polymer composition consisting essentially of a tri(dialkylaminophenyl thioalkylene) phosphite having from thirty to sixty carbon atoms and an alpha mono olefin polymer wherein the phosphite is present in an amount sufficient to increase the resistance of the polymer to heat deterioration.

2. An olefin polymer composition in accordance with claim 1 including, in addition, in a stabilizing quantity, carbon black.

3. An olefin polymer composition in accordance with claim 2 including, in addition, in a stabilizing quantity, a hindered phenol.

4. An olefin polymer composition in accordance with claim 1 including in addition, in a stabilizing quantity, a combination of carbon black and a hindered phenol.

5. An olefin polymer composition in accordance with claim 4 wherein the phosphite has the formula

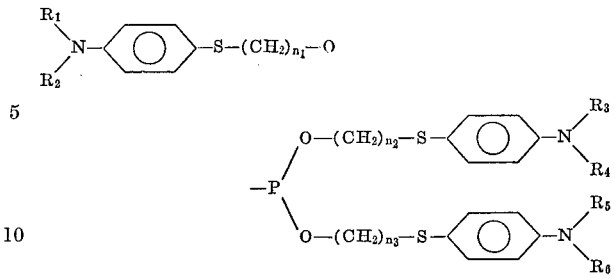

in which $n_1$, $n_2$ and $n_3$ are integers from two to six; and $R_1$, $R_2$, $R_3$, $R_4$, $R_5$ and $R_6$ are alkyl groups having from one to four carbon atoms.

6. An olefin polymer composition in accordance with claim 4 wherein the olefin polymer is a polymer of ethylene, propylene, butylene, pentylene or styrene.

7. An olefin polymer composition in accordance with claim 6 wherein the olefin polymer is an ethylene polymer.

8. An olefin polymer composition in accordance with claim 2 including a hindered phenol having from one to three hundred carbon atoms.

9. An olefin polymer composition in accordance with claim 4 wherein the olefin polymer is polyethylene, the phosphite is tri (4-dimethylaminophenyl thioethylene) phosphite and the hindered phenol is 4,4'-methylene bis (2,6-di-tert-butyl) phenol.

References Cited
UNITED STATES PATENTS 3,408,324 10/1968 Braus et al. _____ 260—45.95
3,480,581 11/1969 Braus et al. _____ 260—45.95

HOSEA E. TAYLOR, Primary Examiner

U.S. Cl. X.R.

260—45.9, 45.95, 945